United States Patent [19]
Lee

[11] Patent Number: 5,241,779
[45] Date of Patent: Sep. 7, 1993

[54] APPARATUS FOR COLLECTING AND KILLING INSECTS

[76] Inventor: Dug G. Lee, 16 N. Broad St., Trenton, N.J. 08608

[21] Appl. No.: 881,070

[22] Filed: May 11, 1992

[51] Int. Cl.⁵ .................................................. A01M 1/08
[52] U.S. Cl. ........................................ 43/139; 43/112; 43/113
[58] Field of Search ................ 43/107, 112, 113, 121, 43/139

[56] References Cited

U.S. PATENT DOCUMENTS

| | | | |
|---|---|---|---|
| 1,583,975 | 5/1926 | Hunt | 43/112 |
| 1,807,550 | 5/1931 | Rector | 43/139 |
| 1,996,293 | 4/1935 | House | 43/113 |
| 3,348,332 | 10/1967 | O'Connell | 43/113 |
| 4,127,961 | 12/1978 | Phillips | 43/113 |
| 4,157,629 | 6/1979 | Parks | 43/113 |
| 4,411,094 | 10/1983 | Spackova | 43/121 |
| 4,856,226 | 8/1989 | Taylor | 43/113 |
| 4,891,904 | 1/1990 | Tabita | 43/112 |
| 4,914,854 | 4/1990 | Zhou | 43/112 |
| 5,020,270 | 6/1991 | Lo | 43/113 |

Primary Examiner—Kurt C. Rowan
Attorney, Agent, or Firm—Sachs & Sachs

[57] ABSTRACT

An apparatus for collecting and killing insects which includes a heat source for attracting the insects to a housing, electric conductor means, for connection to a power source, to stun or kill the insects, means for collecting the insects after they are stunned or killed, and means for vacuuming the insects into a collection vessel so that they can be transported away from the apparatus and disposed. The collection vessel may be filled with oil to assure suffocation of the insects. The subject invention also can be employed in combination with conventional appliances having a heat producing element so that insect infestations attracted to the appliance can be easily disposed of by employment of the subject invention.

18 Claims, 3 Drawing Sheets

APPARATUS FOR COLLECTING AND KILLING INSECTS

BACKGROUND AND/OR ENVIRONMENT OF THE INVENTION

1. Field of the Invention

The present invention relates to apparatuses for collecting and killing insects, and more particularly to an apparatus which not only provides for the killing and collection of the insects but for the simplified sanitary disposal thereof.

2. Description of the Contemporary and/or Prior Art

The problem of collecting, killing and disposing of insects, especially roaches, has plagued man for centuries. Recently, numerous apparatuses have appeared which, by various means, attract flying insects to a chamber and then apply an electrical voltage to the insects to stun or kill them. Such apparatuses which employ special fluorescent lights on the interior of an electrically charged grid are well known for use in killing flying insects. Additionally, devices are shown for electrocuting and stunning insects of the crawling type, such as roaches. It has become apparent that the techniques that easily operate for flying insects are not readily adaptable to crawling insects and as such the two branches of the art have matured separately.

In regard to flying insects, use of suction in the capture of insects where the suction is used in part as a method to draw the insects to or into the apparatus are shown in U.S. Pat. No. 1,126,994 issued to Harrison on Feb. 2, 1915, which discloses an insect trap that includes a fan that draws insects into a collection bag; U.S. Pat. No. 783,752 issued to Marston on Feb. 28, 1905, which teaches an apparatus for collecting insects where insects are drawn through a vacuum into a collection chamber; and U.S. Pat. No. 777,088 issued to Franklin on Dec. 13, 1904, which discloses a flying insect exterminator wherein insects are drawn into a funnel like device by a fan and then are crushed for disposal. The foregoing devices are strictly mechanical and do not employ electricity to stun or kill insects.

The use of suction to draw flying insects into a device where the insects are ultimately electrocuted is shown in several devices such as U.S. Pat. No. 1,807,076 issued to Sweet on May 26, 1931, which teaches a flying insect exterminator wherein suction from a fan causes flying insects, that are attracted by a sounding device, to be drawn to an electrode for electrocution.

Similarly, U.S. Pat. No. 5,020,270 issued to Lo on Jun. 4, 1991, shows a flying insect killing apparatus where suction is used to draw insects into a electric screen for electrocution and collection. Further, U.S. Pat. No. 2,567,616 issued to Moore on Sep. 11, 1951, discloses a flying insect destroyer wherein suction is created to force insects against an electrode for electrocution and lastly, U.S. Pat. No. 4,908,978 issued to Zacharias on Mar. 20, 1990, discloses a flying insect impeller and destroyer wherein a fan is used to propel such insects against an electrode for electrocution.

All the aforegoing devices are designed for flying insects. In contrast, the present invention is configured for killing roaches, which are attracted and drawn into the device by means other than suction, but which after electrocution, are vacuumed together for disposal.

U.S. Pat. No. 2,012,384 issued to Gatti on Aug. 27, 1935, discloses a device for attracting and exterminating vermin wherein a light bulb is used as an attractant. A plurality of electrodes are disposed adjacent to a fabric wick which is impregnated with a current conducting liquid.

As to crawling insect or roach exterminating devices, U.S. Pat. No. 4,709,502 issued to Bierman on Dec. 1, 1987 shows an electric roach trap having a pair of conductors disposed in a housing so that if a roach enters the trap and contacts the electrodes, it is electrocuted. Dead roaches accumulate in the housing and must be manually removed.

U.S. Pat. No. 4,144,668 issued to Darncharnjitt on Mar. 20, 1979 teaches an insect trap where insects are lured into a housing so that they are disposed across electrodes that electrocute the insects A disadvantage of such an apparatus is that it is well known that the insects can detect flow of current through the electrodes and ultimately are conditioned not to climb onto the electrodes. Further, the housing of such traps must be manually cleaned.

U.S. Pat. No. 4,423,564 issued to Davies, et al on Jan. 3, 1984 teaches a cockroach trap which incorporates parallel conductors that are pulsed with electrical voltage. After the insects are electrocuted by this apparatus, they fall into a tray for manual removal. The apparatus also incorporates a pheromone attractant.

Other devices of interest are shown in the U.S. Pat. No. 4,914,854 issued to Zhou, et al on Apr. 10, 1990, and U.S. Pat. No. 4,949,500 issued to Jefferys on Aug. 21, 1990, which each teach an insect or vermin trap with electrodes that are switched on and off.

Although various solutions have been proposed in the prior art for the trapping or killing of crawling insects such as roaches, the effective luring of such insects, killing thereof, and the effective disposal of such crawling insects, without significant handling, has not been accomplished by any prior art devices. The present invention overcomes the problems associated with the prior art by providing an apparatus for collecting and killing insects which provides significant and reliable means for attracting the insects, means for maximizing the killing of the insects, and also means for efficiently disposing of the insects without manual handling. Such an effective and efficient combination is heretofore unknown in the prior art.

SUMMARY OF THE INVENTION

Therefore, a primary object of the present invention is to provide an apparatus for collecting and killing insects which includes reliable means for attracting crawling insects.

A further object of the present invention is to provide an apparatus for collecting and killing insects which does not dissuade insects from entering based on its inherent operating characteristics.

A still further object of the present invention is to provide an apparatus for collecting and killing insect, which includes the use of a readily available and replenishable attractant.

Still another object of the present invention is to provide an apparatus for collecting and killing insects wherein electricity is used to stun and/or electrocute the insects but the electricity is precluded from frightening the insects away.

Still another further object of the present invention is to provide an apparatus for collecting and killing insects which not only regularly attracts the insects thereto, but effectively kills them and prepares them for disposal, without manual handling.

Another further object of the present invention is to provide an apparatus for collecting and killing insects which is readily adaptable for incorporation in an appliance having a heat producing element to collect roaches or the like which are drawn to such appliance.

Another still further object of the present invention is to provide an apparatus for collecting and killing insects which is readily mass produced.

An additional object of the present invention is to provide an apparatus for collecting and killing insects which is efficient in its use of electricity, as its only periodically energized at a set schedule, without the effective attraction properties of the invention being diminished.

Still another additional object of the present invention is to provide an apparatus for collecting and killing insects which is simple in design, inexpensive to manufacture, easy to use, and efficient in operation.

These objects as well as further objects and advantages of the present invention will become readily apparent after reading the ensuing description of several non-limiting illustrative embodiments and reviewing the accompanying drawings.

An apparatus for collecting and killing insects constructed in accordance with the principles of the present invention includes a housing forming a cavity therein, a heat source disposed in the cavity of the housing, electric conductor means disposed in the cavity of the housing and adapted for connection to a power source, collecting means having a removable portion, and vacuum means for vacuuming insects from the cavity of the housing into the removable portion of the collecting means. Further, in one embodiment of the present invention, the housing thereof can be shared with an appliance of the type which incorporates a heat producing element such as an electric motor, so that insects, such as roaches which are attracted to the interior of the appliance by the heat produced by the motor will be preferentially attracted to the subject invention for extermination and disposal.

BRIEF DESCRIPTION OF THE DRAWINGS

In order that the present invention may be more fully understood, it will not be described, by way of example, with reference to the accompanying drawings in which.

DESCRIPTION OF THE PREFERRED EMBODIMENTS

Figure 1:
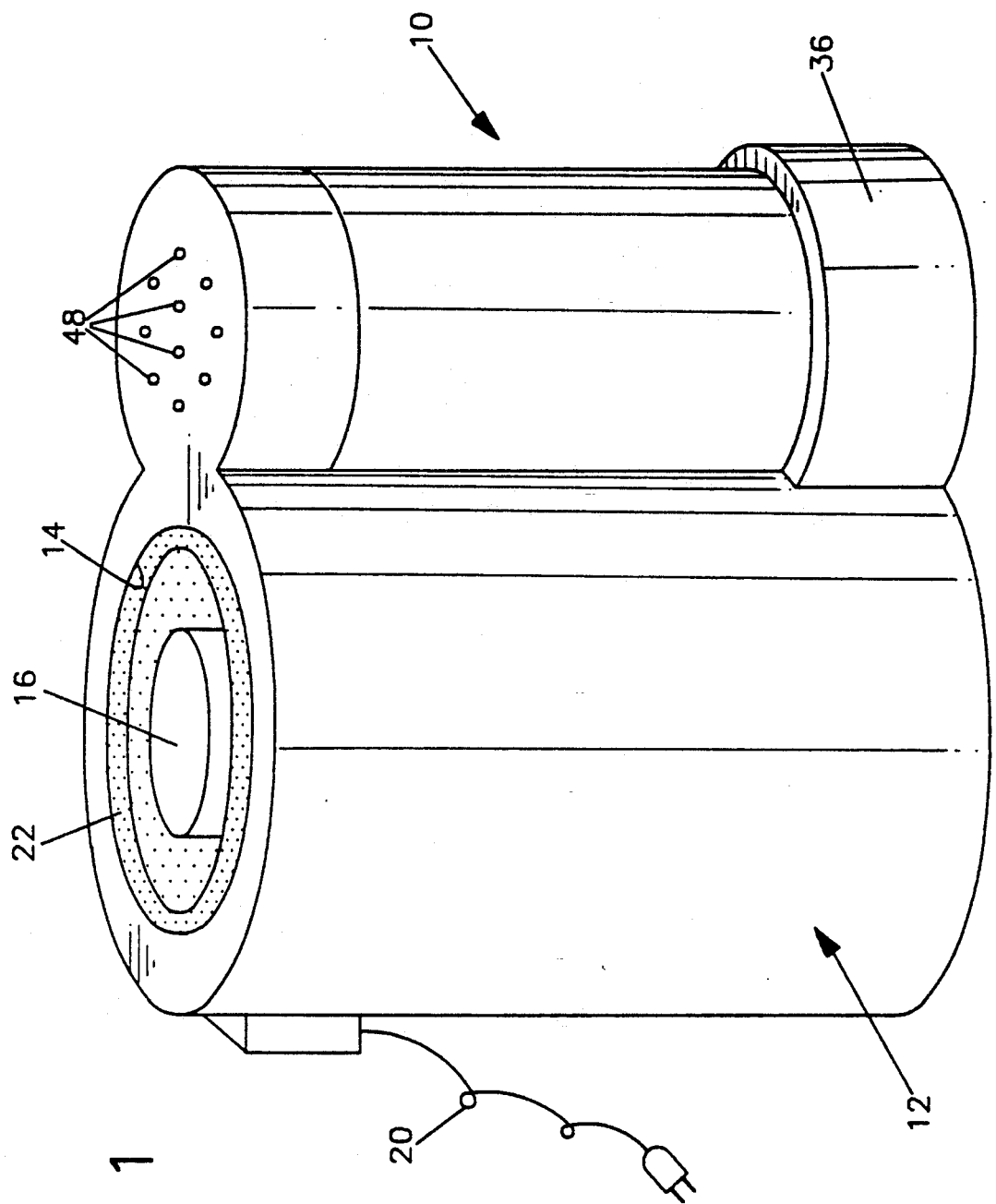
FIG. 1 is a pictorial representation of preferred embodiment of the present invention.
Figure 2:
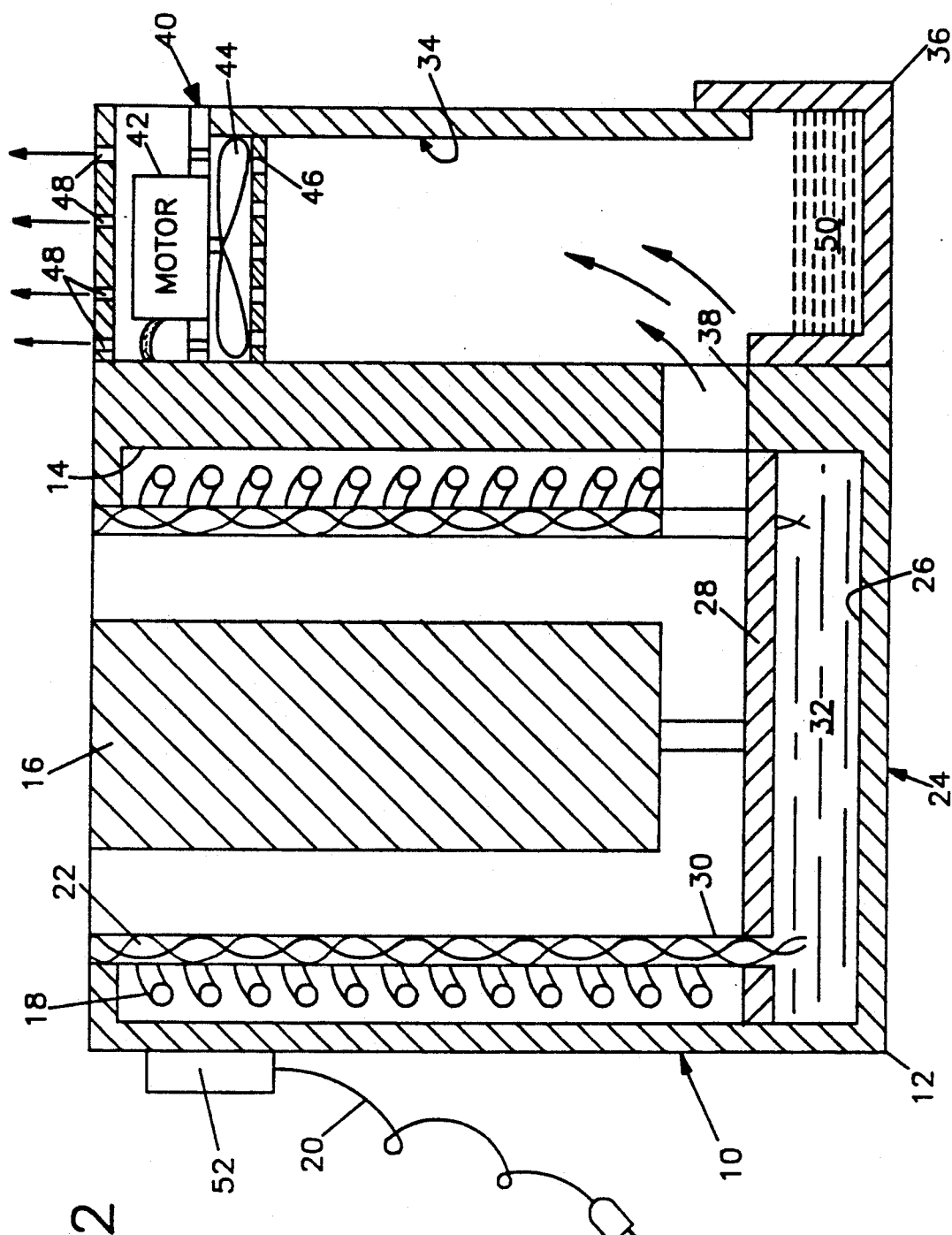
FIG. 2 is a cross sectional view of the subject invention.

Referring now to the FIGURES, and more particularly to FIGS. 1 and 2 thereof, there is illustrated therein a killing and collecting apparatus 10 constructed in accordance with the principles of the present invention. The apparatus 10 includes a housing 12 which forms a cavity 14 therein.

Disposed within the cavity 14 is a heater 16. The heater 16 is of a conventional electrically powered type and may include a heating element, well known in the art, or could produce heat by enclosing a conventional light bulb therein. Also disposed within the cavity 14 is a coil of wire 18 is mounted about the outer walls of the cavity 14. The coil of wire 18 is electrically connected in a manner, not shown, which is conventional so that electrical current can be passed through the coil of wire 18 when a line cord 20 is plugged into a suitable conventional source of power. The energization of such coils for electrocution purposes is known in the art.

Covering the coil of wire 18 is a fabric 22 which has the essential characteristic of being absorbent and wick like. Such fabric 22 is preferably constructed of some type of a woven material incorporating cotton or cotton polyester blend.

Disposed at the base 24 of the housing 12 is a reservoir 26 covered by a plate 28. The plate 28 is solid except for a substantially annular opening 30 through which the fabric 22 passes into the reservoir 26. Disposed within the reservoir 26 is a liquid 32 which has as an essential characteristic thereof the property of sweetness. The liquid 32 can be a sugar water solution which is mixed by the user of the apparatus 10 or could be a pre-sweetened liquid such as soda pop or the like. When the sweet liquid 32 is poured into the cavity 12, it flows therefrom into the reservoir 26 and as a result the fabric 22 acts as a wick to draw the sweet liquid out of the reservoir 26, constantly keeping the fabric 22 saturated with the sweet liquid 32. Since the coil of wire 18 is in contact with the saturated fabric 22, electricity is conducted throughout the fabric 22 and serves as a means for executing insects which enter the cavity 14 and walk on the fabric 22.

It is well known that insects can sense electrical fields and are deterred from entering upon electrically charged surfaces. The present invention avoids this problem by shielding the coil of wire 18, which has electrical current passing therethrough, by the fabric 22 so that insects, especially roaches, are attracted to the sweet liquid 32 saturating the fabric 22 and are then unsuspectedly electrocuted if they stay on the fabric 22 for sufficient time, or at least stunned to incapacitation. Such insects which have come in contact with the fabric 22, after having an electrical current pass therethrough, fall onto the upper surface of plate 28.

Also formed by the housing 12 is a collection chamber 34 having a removable bottom portion 36. The removable bottom portion 36 can be fastened to the housing in any acceptable fashion such as by frictional engagement such as illustrated in the drawing. It is also to be understood that other means such as a twist lock, screw threads, etc., could be employed within the principles and scope of the subject invention.

A conduit 38 is formed in the housing 12 between the cavity 14 and the collection chamber 34 so that the collection chamber 34 and the cavity 14 are in communication with each other. Disposed at the upper portion 40 of the housing 12 is a motor 42 of conventional design having a fan blade 44 mounted thereon. Separating the motor 42 and fan blade 44 from the balance of the collection chamber 34 is a screen 46. The motor 42 and fan blade 44 are of a conventional type well known in the art and create suction within the collection chamber 34 and an exhaust which leaves the collection chamber 34 through orifices 48 disposed therethrough The motor 42 and fan blade 44 are sized in a manner well known to those of ordinary skill in the art to create the desired suction in the collection chamber 34. Such suction is sufficient to draw any insects which land on plate 28 through conduit 38 into the removable bottom portion 36 of the collection chamber 34.

Although not essential for operation of the subject invention, oil 50 is illustrated disposed in the removable bottom portion 36 of the collection chamber 34 so that any insects that may have been stunned rather than electrocuted will die when asphyxiated through contact with the oil 50. By removal of the removable bottom portion 36, oil 50 can be placed therein if desired and any insects which are collected can be removed an disposed of without handling by the user.

It is contemplated that the coil of wire 18 will be periodically energized by a control unit 52, the design of which is well known in the art. It is further contemplated that the motor 42 would simultaneously be energized with the coil of wire 18. As a result, the operation of the apparatus 10 is extremely efficient in that insects, especially roaches, are continuously attracted to the apparatus by virtue of operation of the heater 16 and the presence of the sweet liquid 32 on the fabric 22. When the coil of wire 18 and the motor 42 are activated the insects disposed on the fabric 22 will be shocked or electrocuted and will fall upon the upper surface of the plate 28. Since the motor 42 has been simultaneously activated, suction will be created within the collection chamber 34 drawing the insects from the upper surface of the plate 28 into the removable bottom portion 36 of the collection chamber 34. If the collection chamber 34 is filled with oil 50 as illustrated the insects, if not previously electrocuted will be asphyxiated. However, even if the insects are not totally dead, they can be removed by the user through removal of the removable bottom portion 36. It is contemplated that the coil 18 and the motor 42 would be periodically activated at a schedule, for instance, of every 10 or 15 minutes for a short interval to insure efficient operation of the apparatus 10.

The housing 12 may be constructed of any suitable material such as one of the various readily available plastics employed for manufacture by injection molding.

The only routine servicing required by the user would be the addition of sweet liquid 32 to the cavity 14 to fill the reservoir 26 when the fabric 22 is no longer saturated with such sweet liquid 32; and to periodically remove and dump the removable bottom portion 36.

Figure 3:
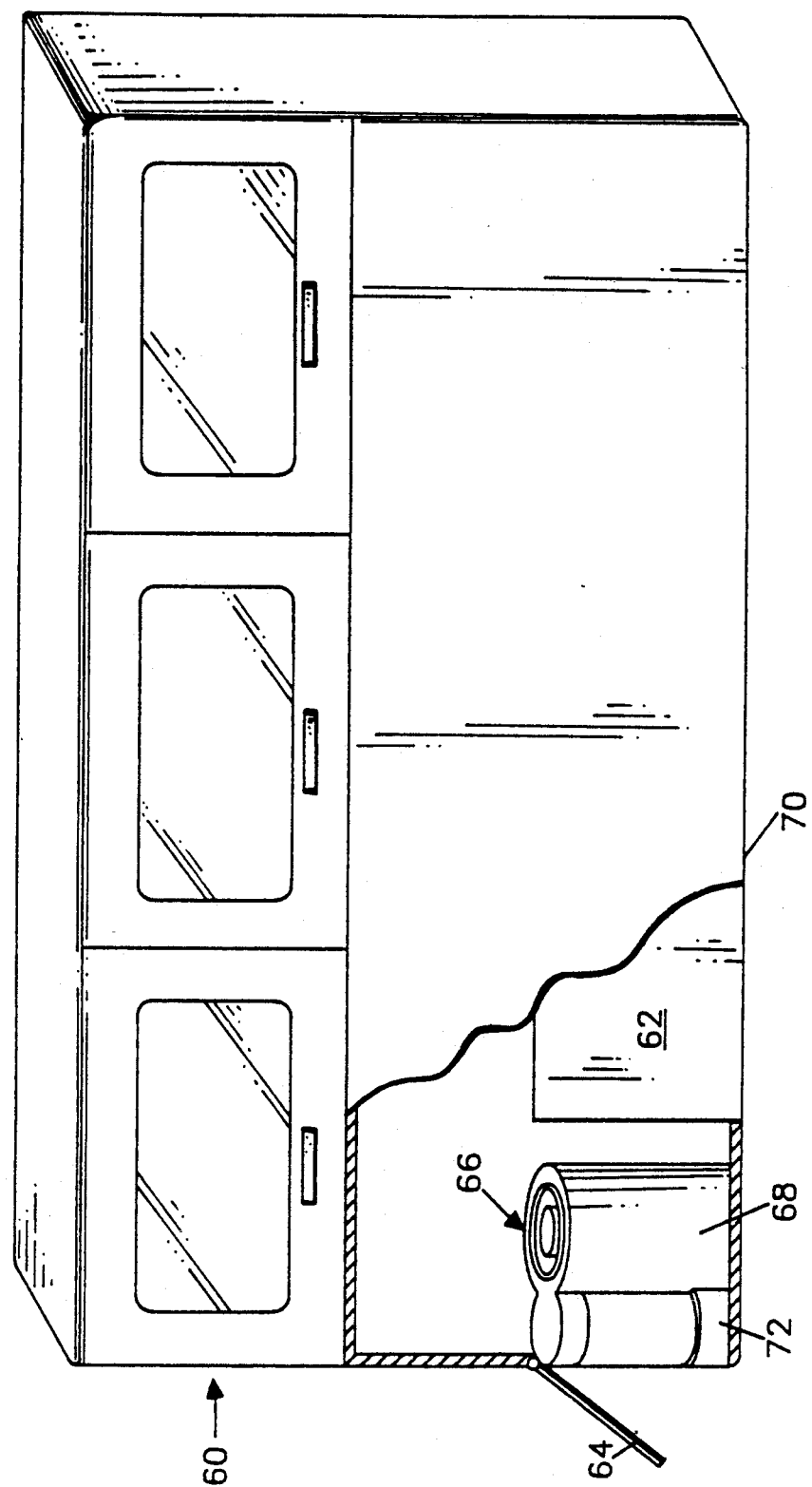
FIG. 3 is a partially broken away pictorial representation of a conventional freezer type appliance incorporating apparatus constructed in accordance with the principles of the present invention.

With reference to FIG. 3, there is illustrated therein a freezer 60 of conventional design. Freezer 60 includes a compressor 62, also of conventional design. During the chilling operation of the freezer 60, the compressor 62 produces heat. It has been found that such appliances which include heat producing elements such as compressor 62 frequently become infested with roaches which seek the heat. Such roach infestations are not only unsanitary, but in extreme cases can impair the operation of the appliance The present invention can be incorporated in appliances such as freezer 60 and can readily attract and permit disposal of roaches so that such roach infestation is not experienced.

Specifically, disposed within the freezer 60 and accessible through trap door 64 is an insect killing and collecting apparatus 66 constructed in accordance with the principles of the present invention. The apparatus 66 includes a housing 68 which is integral with the housing 70 of the freezer 60. The housing 70 includes a removable portion 72 that functions in the exact same manner as the removable bottom portion 36 as illustrated in FIGS. 1 and 2. Further, the apparatus 66 includes exactly the same elements and operational conditions as the insect killing and collecting apparatus 10. As a result, all of the benefits of the apparatus 10 are enjoyed, but in the environment of and with full integration in the freezer 60.

Of course it is to be understood that freezer 60, as the host appliance for the subject invention, has been selected for purposes of illustration, but the subject invention could easily be equally well integrated into other appliances such as refrigerators and other industrial equipment, the common design characteristic of which is that they incorporate a heat producing element which attracts roaches to the detriment of the operation and sanitation of the equipment.

It will be understood that various changes in the details, materials, arrangements of parts, and operational condition which have been herein described and illustrated in order to explain the nature of the invention, may be made by those skilled in the art within the principles and scope of the invention.

Having thus set forth the nature of the invention what is claimed is:

1. An apparatus for collecting and killing insects comprising:
   a housing forming a cavity therein;
   a heat source disposed in said cavity of said housing;
   electric conductor means disposed in said cavity of said housing, said electric conductor means for passing an electric current through the insects when the insects come in contact therewith, aid electric conductor means adapted for connection to a power source;
   collecting means having a removable portion;
   vacuum means for vacuuming insects from said cavity of said housing into said removable portion of said collecting means;
   reservoir means disposed in said housing, said reservoir means adapted to receive therein a liquid attractant; and
   absorbent material means disposed in said housing so as to cover said electric conductor means, said absorbent material means being in communication with said reservoir means so as to absorb the liquid attractant disposed therein.

2. An apparatus in accordance with claim 1, wherein said absorbent material comprises cloth.

3. An apparatus in accordance with claim 1, further comprising an oil receiving portion disposed in said removable portion of said collecting means.

4. An apparatus in accordance with claim 1, further comprising means for periodically connecting and disconnecting said power source to said electric conductor means.

5. An apparatus in accordance with claim 4, wherein said vacuum means includes an electrically powered fan, said fan being electrically connected to said power source through said automatic connecting and disconnecting means.

6. An apparatus in accordance with claim 1, wherein said heat source comprises an electric heater for connection to the power source.

7. An apparatus in accordance with claim 1, wherein said electric conductor means comprises a coil of wire.

8. An apparatus in accordance with claim 1, wherein said attractant comprises a sweet liquid.

9. A combination comprising:
   an appliance having a housing, said appliance including a heat producing element;

a sub-housing disposed within said housing, said sub-housing forming a cavity therein;

electric conductor means disposed in said sub-housing, said electric conductor means for passing an electric current through the insects when the insects come in contact therewith, said electric conductor means adapted for connection to a power source;

collecting means having a portion removable from said sub-housing and said housing;

vacuum means for vacuuming insects form said cavity of said housing into said removable portion of said collecting means;

reservoir means disposed in said sub-housing, said reservoir means adapted to receive therein a liquid attractant; and absorbent material means disposed in said sub-housing so as to cover said electric conductor means, said absorbent material means being in communication with said reservoir means so as to absorb the liquid attractant disposed therein.

10. A combination as claimed in claim 9, further comprising heat source disposed in said cavity of said sub-housing.

11. A combination in accordance with claim 10, wherein said absorbent material means comprises cloth.

12. A combination in accordance with claim 9, further comprising an oil receiving portion disposed in said removable portion of said collecting means.

13. A combination in accordance with claim 9, further comprising means for automatically connecting and disconnecting said power source to said electric conductor means.

14. A combination in accordance with claim 13, wherein said means includes an electrically powered fan, said fan being electrically connected to said power source through said automatic connecting and disconnecting means.

15. A combination in accordance with claim 9, wherein said heat source comprises an electric heater for connection to the power source.

16. A combination in accordance with claim 9, wherein said electric conduction means comprises a coil of wire.

17. A combination in accordance with claim 10, wherein said attractant comprises a sweet liquid.

18. An apparatus for collecting and killing insects comprising;

a housing having a cavity therein;

a heat source disposed in said cavity of said housing;

electric conductor means disposed in said cavity of said housing, said electric conductor means comprising a coil of wire, said coil of wire for connection to a power source;

collecting means having a removable portion;

vacuum means for vacuuming insects from said cavity of said housing into said removable portion of said collecting means, said vacuum means including an electrically powered fan, said fan adapted to be connected to the power source;

means for periodically connecting and disconnecting said power source to said coil of wire and electrically powered fan;

reservoir means disposed in said housing, said reservoir means adapted to receive therein a liquid attractant; and absorbent material disposed in said housing so as to cover said electrical conductor means, said absorbent material means being in communication with said reservoir means so as to absorb the liquid attractant disposed therein.

* * * * *

UNITED STATES PATENT AND TRADEMARK OFFICE
CERTIFICATE OF CORRECTION

PATENT NO. : 5,241,779
DATED : September 7, 1993
INVENTOR(S) : Dug G. Lee

It is certified that error appears in the above-indentified patent and that said Letters Patent is hereby corrected as shown below:

Column 4, line 64; after "therethrough" please add -- . --.

Column 6, line 30; delete "aid" and replace therefor -- said --.

Column 7, line 11; delete "form" and replace therefor -- from --.

Signed and Sealed this

Twelfth Day of April, 1994

Attest:

BRUCE LEHMAN

Attesting Officer     Commissioner of Patents and Trademarks